Patented Aug. 31, 1954

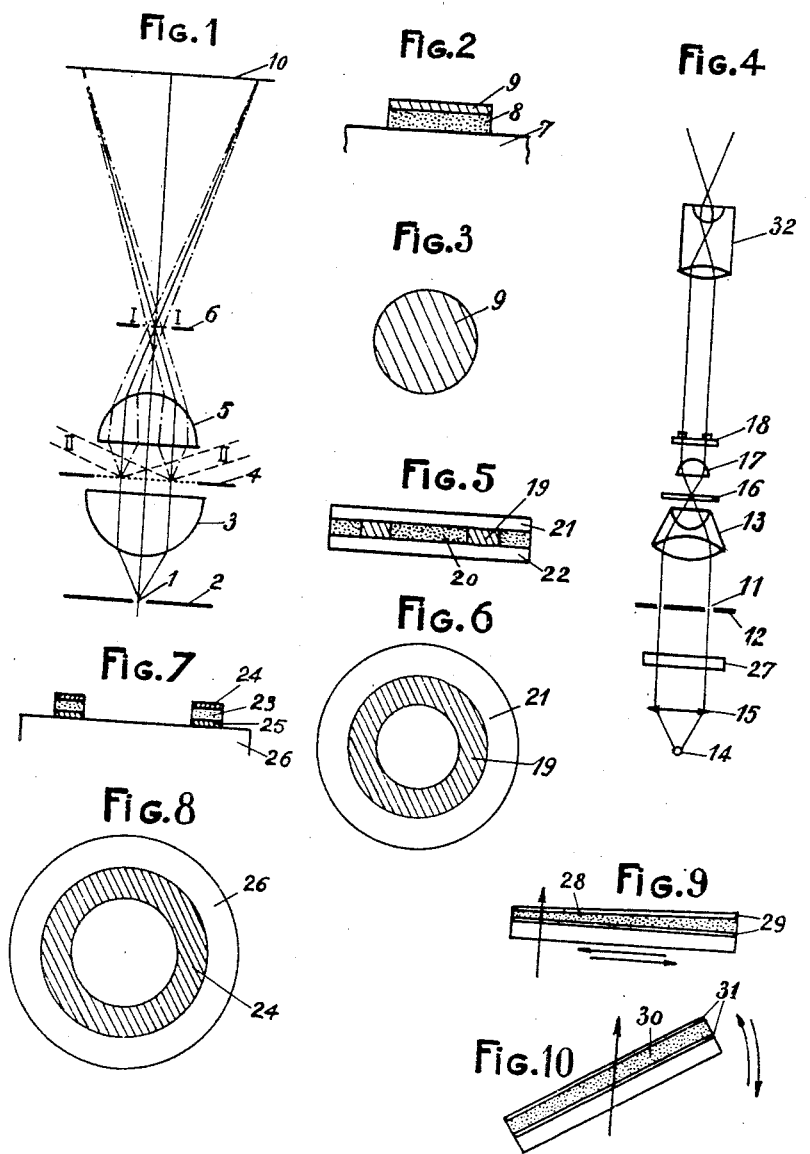

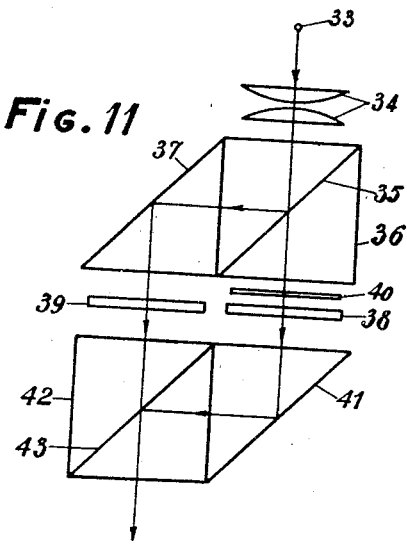
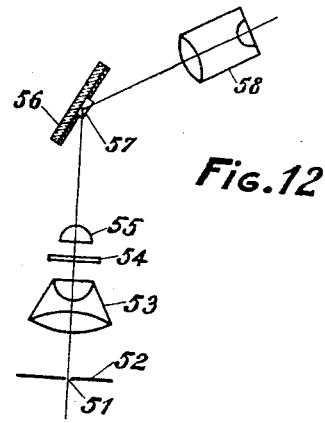
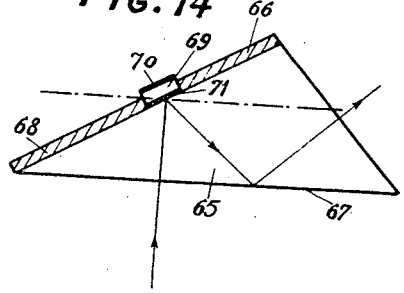
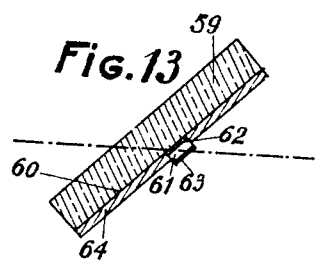
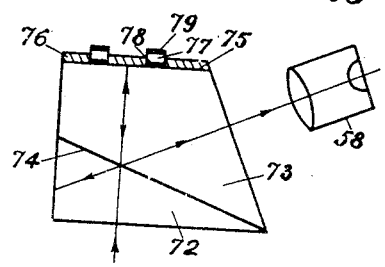

2,687,670

UNITED STATES PATENT OFFICE 2,687,670

OPTICAL DEVICE WITH A VARIABLE AND COLORED PHASE CONTRAST

Marcel Victor Locquin, Malakoff, France, assignor to Societe Anonyme de Vente des Instruments de Geodesie Henri Wild, Heerbrugg, Switzerland, a body corporate of Switzerland Application April 25, 1951, Serial No. 222,825

Claims priority, application France April 26, 1950

6 Claims. (Cl. 88—39)

The present invention relates to an optical device to observe, according to the so called phase contrast method, specimens offering small irregularities of their optical properties giving rise to slight phase differences between the passing through light rays and the reflected light rays.

The method set out by the physicist F. Zernike is specially used in microscopy for observing living tissues in a fresh condition and without a preliminary colouring. The component units of such a specimen are only made noticeable by slight differences of thickness or of refractive index. They offer only trifling transparency variations, which are perceived by the eye in a very defective way. The eye, as the photographic plate, is in fact, only sensitive to the amplitude and specially to the amplitude variations of the light waves but not to their phase differences.

The phase contrast method of Zernike consists in transforming these slight and invisible phase differences in amplitude differences, which are discernible with the eye, by introducing a given phase difference, such as between the geometric rays and the refracted rays emanating from the specimen.

The method is based on the fact, already mentioned by Abbé—that, in an optical system such as a microscope, the geometric rays, issuing from the source and crossing through the specimen under observation form a very narrow beam: on the contrary, the rays diffracted by the elements of the specimen form a much more open beam.

It becomes thereby possible to create a given rate difference, between the geometric rays and the diffracted rays by placing in the plane of one of the real images of the source in the optical system a diffraction plate, the active portion or conjugate area of which covers substantially the area of said real image.

The annexed drawing shows an example of an embodiment of the phase contrast method.

The Figure 1 shows diagrammatically the essential part of the optical assembly of Zernike.

The Figures 2 and 3 are a sectional view and a plane view, respectively, of a diffraction plate.

The light source (Figure 1) consists in the opening 1 of a diaphragm 2 placed in the object focal plane of a condenser 3. The specimen 4 is placed between the condenser 3 and the object lens 5; the light beam passing through it is diffracted by the fine structure of this specimen 4 in an axial central maximum, corresponding to the geometric beam, and in lateral spectra, of first and second order. The rays of the geometric beam (thick stroke) and the properly called diffracted rays (dash and dots lines), belonging to the two spectra of the first order can enter the object lens. In the plane 6 of the real image of the source 1 is placed a diffraction plate, shown in Figure 2. This plate is made with a glass plate 7 having an extra thickness made of a transparent substance 8, such as cryolite, silica or magnesium fluoride, the area of which covers the real image of the source and over which is superimposed a semi-transparent layer 9 made for instance of aluminum. The conjugate area of the diffraction plate, according to its thickness, delays or accelerates the geometric rays, of $$\frac{\lambda}{4}$$

for instance, with relation to the diffracted rays, the fairly total amount of which flows through the periphery of this central spot. The semi-transparent layer of aluminum will partially absorb the geometric rays and facilitate the contrast since the diffracted light is, of course, weaker than the direct light. The image of the specimen is formed in the plan 10 of the Figure 1 where it is observed with an eye-piece or photographed: it results of the superimposition of a direct image and of a diffracted image. When the diffraction plate delays the direct beam of a quarter of a period, the contrast is said to be negative or bright: a fine element, more refringent or thicker, of the specimen seems to be clearer than the surroundings. When the diffraction plate accelerates the direct beam of a quarter of a period, the contrast is said to be positive or dark: a fine element more refringent or thicker, appears darker than the surroundings.

The Zernike method is not limited to the microscopic observations, it is also used to study the polish of a surface, for instance of a lens in transparency or of a telescopic mirror in reflection.

It is generally admitted that it is highly desirable to be able to vary the aspect of the observed image, by adjusting the intensity of the direct image and of the diffracted image, respectively, passing, at will, from the dark contrast to the bright contrast, or inversely, and even modifying the dephasing of the two corresponding waves. The Zernike device, above described, does not allow it. Many methods have been invented to this end, in particular by the author of the present invention, M. Marcel Locquin (patent application filed on June 20, 1947, in the name of Centre National de la Recherche Scientifique, with the title "Utilisation de la lumière polarisée pour l'examen de structures et notamment de structures microscopiques"), and also by Kastler and Montarnal, Didelin, Osterberg and his fellow-workers, Taylor, Françon, Nomorski, but all these devices make use of the polarized light and can be used only for the specimens which are not birefringent. On the other hand, apparatuses such as the Kastler and Montarnal apparatus, allowing to simultaneously adjust the amplitude and the dephasing, and the change of the bright contrast to the dark contrast, require very complicated assemblies, particularly to obtain the variable dephasing.

The device, according to the present invention, belongs to the above described type and aims at coping with the mentioned drawbacks. It is characterized in that a fixed selective filter is associated with the conjugate area of the diffraction plate, whilst a variable selective filter is associated with the light source, so that the wave-length of the natural light illuminating the specimens may be varied at will be the operator.

The direct rays are thereby subjected to the action of the selective filter associated with the diffraction plate, whilst the diffracted rays are not. If the variable selective filter associated with the light source transmits a radiation band having a mean wave length identical with the length of the band transmitted by the filter of the diffraction plate, the direct rays absorption is reduced to a minimum. If, on the contrary, the mean wave-length of the light transmitted by the variable filter associated with the source differs slightly of the length of the light transmitted by the diffraction plate, the absorption becomes greater, and increases as one departs more from the mean wave-length of the band transmitted by the diffraction plate. As long as one is not too far apart of this wave-length, the dephasing does not vary in a marked manner whilst the intensity of the direct image varies quite easily, with very great suppleness and speed, when compared to the intensity of the diffracted image. When, on the contrary, one gets more farther apart of the mean wave-length of the band transmitted by the diffraction plate, the relative intensity of the two images remains fairly constant, but the dephasing of the two corresponding waves varies notably.

On the other hand, the inventor has discovered that, in the special case in which the filter associated with the diffraction plate is an interferential filter, the contrast is bright or dark according as the mean wave-length of the light illuminating the specimen is greater or smaller than the length of the band transmitted by the interferential filter of the diffraction plate.

A first alternate form of the invention, based on said property, is characterized in that the conjugate area of the diffraction plate is associated with an interferential filter, whilst the light source is equipped with two associated selective filters, so as to let pass two narrow bands of light radiations, the wave-length of a band being greater, the wave-length of the other band being smaller than the mean wave-length of the band transmitted by the interferential filter of the diffraction plate. A coloured contrast is thereby obtained.

An other alternate form is characterized in that a selective filter of any type is associated with the surface of the diffraction plate which is not covered by the real image of the source, the mean wave-length of the band transmitted by this filter being different of the length of the band transmitted by the conjugate area of the diffraction plate.

Since the illumination of the specimen is fairly monochromatic and has a variable mean wave-length, the absorption is, at will, applied to the geometric beam or to the diffracted rays beam and no more to the geometric beam only, as in the case of the chief characteristic.

As an example, a preferred form of an embodiment of the invention will now be described and diagrammatically shown in the annexed drawing, together with a few alternate forms of particulars.

The Figures 1, 2, 3 show the known device, above described.

The Figure 4 shows diagrammatically the optical assembly according to the invention.

The Figures 5 and 6 show a first embodiment of the diffraction plate of the device, according to the invention, in plan view and in section, respectively.

The Figures 7 and 8 show, in plan view and section respectively, another embodiment of the same diffraction plate.

The Figures 9 and 10 show in section two interferential filters associated with the light source.

The Figure 11 is a device allowing to combine two monochromatic lights.

The Figure 12 shows diagrammatically an alternate form of an optical assembly according to the invention.

The Figures 13, 14, 15 respectively, are sections of the three alternate embodiments of the diffraction plate used in the last embodiment.

The light source is constituted (Fig. 4) by the aperture, in the shape of an annular opening of a diaphragm 12 disposed in the specimen focal plane of a condenser 13. A lamp 14 illuminates the diaphragm 12 by means of a parallelizer 15. The specimen 16 is placed between the condenser 13 and the front-lens of the objective 17. In the plane 18, conjugated with the plan of the ring 11 of the diaphragm 12 in the optical system formed by the condenser 13 and the objective 17, is placed a diffraction plate, the ring shaped conjugate area of which covers the real image of the ring 11 in the plane 18. This portion is preferably (Figures 5 and 6) made of a thin ring 19 of a transparent substance, such as gelatin or regenerated cellulose coloured to serve as a selective filter. This ring 19 is surrounded by a resin 20, such as Canada balsam and included between two glass plates 21 and 22. The two glass plates, 21 and 22 may advantageously be replaced by the two sticked faces of a doublet of the optical system. The thickness and the index of the coloured ring 19 are chosen, with reference to the resin index, so that the so constituted phase plate will introduce the desired dephasing between the geometrical beam and the diffracted rays beam, for instance a delay of $$\frac{\lambda}{4}$$

diffraction.

The plate may also be made (Figures 7, 8) of an interferential filter; for instance, of a cryolite ring, 23, included between two semi-transparent layers of aluminum, 24 and 25 and resting on a glass plate or on the face of a lens 26. The thickness of the cryolite ring 23 is determined according to the mean wave-length of the band which it is desired to send through said interferential filter.

With the above condition fulfilled, the result is that when such a plate is mounted in the air, it imparts automatically a delay nearing $$\frac{\lambda}{4}$$

to the geometrical beam with relation to the diffracted rays beam.

Between the diaphragm 12 (Figure 4) and the condenser 13 is disposed a variable selective filter 27. It is made of either a set of coloured filters, either of a prism or diffraction grating monochromator, either of one or several Christiansen or Lyot filters.

In an easier and handier way, it may be made of an interferential filter (Fig. 9), the median and transparent layer 28 of which, included between the two semi-transparent layers 29, has the shape of a prism with a very acute angle. By simply mounting such filter in a way allowing to move it transversally with reference to the rays issuing, from the source 11, one can obtain a light band having a wave-length varying in a continued way, as the mean thickness of the transparent plate varies in a continued way during the movement of the filter. The variable selective filter can also be constituted by an interferential filter (Fig. 10) having a median transparent layer 30, of uniform thickness, included between the two semi-transparent layers 31, said filter being mounted to be able to slant in the direction of the light rays, by simply fixing it on a stand pivoted on an axis perpendicular to the said direction. In the case of important incidences, it may be found advantageous to use in addition a rotative polarizing filter to secure the monochromatism of the transmitted light.

The above described device operates according to the mentioned principles. To work with a fixed dephasing and a variable intensity contrast, one selects a diffraction plate, the transmitted band of which is about in the middle of the spectrum, about the green-yellow for instance, and one illuminates the specimen with a light having a variable mean wave-length in the vicinity of the wave-length of the band transmitted by the diffraction plate: in the real image observed through the eye-piece 32 (Fig. 4), the intensity of the direct image varies with respect to the intensity of the diffracted image.

To work with a variable dephasing, one selects a diffraction plate, the transmitted band of which has a mean wave-length situated at one end of the visible spectrum and one illuminates the specimen with a light having a mean wave-length varying in the entire rest of the spectrum range: the dephasing varies without a noticeable change in the ratio of the light intensities.

If the diffraction plate is constituted by an interferential filter, it is possible to pass from the dark contrast to the bright contrast and inversely. To work with a dark contrast, one selects, for instance, a yellow diffraction plate and one illuminates the specimen with a yellow-green light.

To work with a bright contrast, one selects a green diffraction plate and one illuminates also the specimen with a yellow-green light.

It is possible to work with a varying contrast and to bring out the smallest details of the image through a kind of flickering phenomenon.

The use of a diffraction plate constituted with an interferential filter allows also the production of a coloured contrast by selecting for instance a green diffraction plate, giving a bright contrast when the light varies from the red to the green and a dark contrast when the light varies from the green to the blue. The source is equipped with two associated filters or with a complex filter, issuing only a mixing of yellow and blue, for instance, the resulting image is the superimposition of a bright contrast in yellow and a dark contrast in blue.

The fine structures appear accordingly variously coloured, from yellow to green, according to the contrast intensity, on a uniformly green foundation. Coarser particulars, producing more important path differences may appear in blue. It is to be noted that this coloured contrast is achieved without any complication of the phase plate.

The Figure 11 shows a preferred embodiment of the two associated filters, issuing only a mixing of two fairly monochromatic lights. The light beam emanating from the bulb 33 and passing through the paralleliser 34 is broken up in two perpendicular beams by the semi-reflecting hypotenuse surface 35 of an Abbé cube 36. A total reflexion-prism 37 makes the two beams parallel. On the path of the first one is disposed a selective coloured filter 38, blue, for instance, and on the path of the second beam is a different selective coloured beam, yellow, for instance. A complementary filter 40, of a neutral grey, conveniently selected, placed on the path of one of the two beams, allows to control the intensity of a beam with respect to the other. A symmetrical optical system, consisting in a total reflexion prism 41, and a semi-reflecting hypotenuse surface 43 of an Abbé cube 42, forms anew a single beam composed of two fairly monochromatic radiations. This compound beam illuminates the aperture 11 of the diaphragm 12 of the device according to the invention (Fig. 4).

To end, an improvement of the invention, which is suitable for any type of the diffraction plate and of the associated filter, consists in equipping the diffraction plate with a second filter, associated with the surface which is not covered by the real image of the light source. One selects, for instance, a yellow filter for the conjugate area of the diffraction plate, a blue filter for the rest of the diffraction plate and one illuminates the specimen with a fairly monochromatic light, having a variable mean wave-length. A simple variation of this wave-length allows to apply the relative absorption of the diffraction plate to the direct rays or to the diffracted rays.

The Figures 12 to 15 relate to an alternate embodiment of the optical assembly according to the invention in which the fixed selection filter associated with the conjugate area of the diffraction plate is constituted with an interferential filter working by reflexion.

According to Figure 12, the light source is constituted by the aperture 51, shaped as a rectilinear slot (perpendicular to the plane of the figure) of a diaphragm 52 placed in the focal plane of a condenser 53. The specimen 54 is disposed between the condenser 53 and the front lens of the objective 55. A diffraction plate 56, working by reflexion is arranged so that the conjugate area 57 of this diffraction plate intersects the plane of one of the real images of the slot 51 through the optical system constituted by the condenser 53, the objective 55 and eventually the additional optical systems which are interposed between the objective 55 and the diffraction plate 56. The eye-piece is arranged on the side. In the Figure 13, the diffraction plate 56 consists of a glass plate 59 having a plane face with which is coupled an interferential filter working by reflexion and including a cryolite layer 61 contained between two semi-reflecting metallic layers 62 and 63, made of aluminum for instance. The dash and dotted lines show the trace of a plane conjugate with the diaphragm in the optical system. The thickness of the cryolite layer depends on the mean wave-length of the light band which is to be reflected by the filter. The filter has the shape of a rectilinear slot (perpendicular to the plane of the figure): around the filter, the face 60 is covered with a metallic, opaque and reflecting layer 64. Such a diffraction plate works exactly in the same way as the diffraction plate with an interferential filter working by transmission, which has been above described and imparts to the geometrical beam, a phase difference of about $$\frac{\lambda}{4}$$

with relation to the diffracted rays beam.

In the Figure 14, the optical system includes a prism 65 to slant the light beam, as is the case for the binocular microscopes. The light rays are reflected on the faces 66, 67. On the face 67, the reflexion can be a total one: On the contrary, the face 66 receives the rays under an angle smaller than the total reflexion angle and is covered with a metallic opaque and reflecting layer 68. An interferential and working by reflexion prism, made for instance of a cryolite layer 69, included between two metallic semi-transparent layers 70, 71, takes on the face 66 the place of the metallic opaque layer 68 so as to fairly cover the real image of the slot 1 in the optical system.

In the Figure 15, the prism used to slant the beam consists of two coupled parts 72, 73, the common face 74 of which forms a semi-reflecting surface. The upper part has an horizontal face 75, covered with a metallic opaque reflecting layer 76. The interferential filter is coupled with this face 75. The light rays cross through the common face 74, are reflected first by the face 75, afterwards by the common face 74 and come out slanting towards the eye-piece 58.

This arrangement leads to a loss of light energy on the common face 74, but, owing to the face 75 horizontality allows the suitable use of an annular shaped aperture as a light source. In this case, the interferential filter consists of a cryolite ring 77 included between two metallic semi-transparent layers, 78 and 79.

It must be understood that the present invention is not limited to observations with the visible light; it can also apply to observation with ultra-violet and infra-red light, provided that transparent materials for the used radiations are selected.

In addition, it must be noted that the invention allows the adjustment of the intensity of the geometric beam with relation to the intensity of the diffracted pencils, whatever may be the rate difference generated by the diffraction plate. The ultimate value of this difference may be null. The optical device according to the invention applies there to the observation without phase contrast and allows to vary the aspect of the image under observation by adjusting the relative intensity of the image background, from a bright background to a black one.

What I claim is:

1. An optical device for producing contrast in an optical image of an object so nearly uniform in transparency and surface structure as to give little and unsatisfactory indication by microscopic observation, including a lens system for directing to the object to be observed light issued from a source of white light, a lens system for forming an image of said object, an opaque diaphragm having a single aperture formed therein for admitting from said source light having a predetermined contour to the first named lens system and disposed substantially at the entrance pupil of the first named lens system, a phase modifying plate disposed substantially at the back focal plane of the second named lens system in which back focal plane the said lens systems form an image of the single aperture, the said phase modifying plate consisting of an active area formed by the part of the phase plate co-inciding with the image of the single aperture formed in the diaphragm and of a complementary area formed by the remainder part of the phase plate, a variable filter, inserted between the apertured diaphragm and said source and adapted for selecting therefrom radiations comprised in a predetermined wave length band and for selectively illuminating with at least one of such radiations the apertured diaphragm and both of said lens systems, and a fixed interference filter associated to one of said areas of the phase plate whereby the phase shift and light absorption properties of said interference filter are modified in accordance with the wave length of the said illuminating radiation selected by the means associated to the source of white light.

2. An optical device according to claim 1 in which the variable filter associated to the source of white light is an interference filter adapted to be adjusted in a direction perpendicular to the rays issued from said source and consists of a first semi-transparent plate perpendicular to said rays, a second semi-transparent plate inclined over the first and a transparent dielectric material inserted between both said plates.

3. An optical device according to claim 1 in which the variable filter associated to the source of white light is an interference filter pivotally mounted on an axis perpendicular to the mean direction of the rays issued from said source of white light and consists of two semi-transparent plates arranged in parallel spaced relation to each other and of a transparent dielectric material inserted therebetween.

4. An optical device for producing contrast in an optical image of an object so nearly uniform in transparency and surface structure as to give little and unsatisfactory indication by microscopic observation, including a lens system for directing to the object to be observed light issued from a source of white light, a lens system for forming an image of said object, an opaque diaphragm having a single aperture formed therein for admitting from said source light having a predetermined contour to the first named lens system and disposed substantially at the entrance pupil of the first named lens system, a phase modifying plate disposed substantially at the back focal plane of the second named lens system in which back focal plane the said lens systems form an image of the single aperture, the said modifying plate consisting of an active area formed by the part of the phase plate coinciding with the image of the single aperture formed in the diaphragm and of a complementary area formed by the remainder part of the phase plate, a first fixed interference filter covering the active area of the phase plate and consisting of a layer of cryolite inserted between two semi-transparent layers of aluminium, and a second variable interference filter inserted between the source of white light and the diaphragm and slidably supported in the device in a direction perpendicular to the mean direction of the rays issued from the source of white light, the said second interference filter consisting of a first semi-transparent plate perpendicular to said mean direction, a second semi-transparent plate inclined over the first plate and a transparent dielectric material inserted between both said plates.

5. An optical device for producing contrast in an optical image of an object so nearly uniform in transparency and surface structure as to give little and unsatisfactory indication by microscopic observation, including a lens system for directing to the object to be observed light issued from a source of white light, a lens system for forming an image of said object, an opaque diaphragm having a single aperture formed therein for admitting from said source light having a predetermined contour to the first named lens system and disposed substantially at the entrance pupil of the first named lens system, a phase modifying plate disposed substantially at the back focal plane of the second named lens system in which back focal plane the said lens systems form an image of the single aperture, the said modifying plate consisting of an active area formed by the part of the phase plate coinciding with the image of the single aperture formed in the diaphragm and of a complementary area formed by the remainder part of the phase plate, a first fixed interference filter covering the active area of the phase plate and consisting of a layer of cryolite inserted between two semi-transparent layers of aluminium, and a second variable interference filter disposed between the source of white light and the diaphragm and pivotally mounted on an axis perpendicular to the mean direction of the rays issued from the source of white light, the said second interference filter consisting of two semi-transparent plates arranged in parallel spaced relation to each other and of a transparent material inserted therebetween.

6. An optical device for producing contrast in an optical image of an object so nearly uniform in transparency and surface structure as to give little and unsatisfactory indication by microscopic observation, including a lens system for directing to the object to be observed light issued from a source of white light, a lens system for forming an image of said object, an opaque diaphragm having a single aperture formed therein for admitting from said source light having a predetermined contour to the first named lens system and disposed substantially at the entrance pupil of the first named lens system, a phase modifying plate disposed substantially at the back focal plane of the second named lens system consisting of an active area one part of which only coincides with the image of the single aperture in the diaphragm and of a complementary area formed by the remainder part of the phase plate, the said phase plate being inclined over the mean direction of the rays issued from the source of white light and comprising a first fixed interference filter associated to the active area and a fixed opaque reflecting filter, and a second variable interference filter inserted between the source of white light and the diaphragm, adjustably supported in the device relatively to the mean direction of the rays issued from said source of white light.

References Cited in the file of this patent

UNITED STATES PATENTS

| Number | Name | Date |
| --- | --- | --- |
| 2,105,671 | Roesch | Jan. 18, 1938 |
| 2,516,905 | Osterberg et al. | Aug. 1, 1950 |
| 2,616,334 | Zernike | Nov. 4, 1952 |

FOREIGN PATENTS

| Number | Country | Date |
| --- | --- | --- |
| 648,801 | Great Britain | Jan. 10, 1951 |